United States Patent
Saiga et al.

(10) Patent No.: US 12,543,925 B2
(45) Date of Patent: Feb. 10, 2026

(54) ENDOSCOPIC EXAMINATION SUPPORT APPARATUS, ENDOSCOPIC EXAMINATION SUPPORT METHOD, AND RECORDING MEDIUM

(71) Applicant: NEC Corporation, Tokyo (JP)

(72) Inventors: Hiroyasu Saiga, Tokyo (JP); Tatsu Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 18/559,159

(22) PCT Filed: Jul. 31, 2023

(86) PCT No.: PCT/JP2023/028003
§ 371 (c)(1),
(2) Date: Nov. 6, 2023

(87) PCT Pub. No.: WO2024/029504
PCT Pub. Date: Feb. 8, 2024

(65) Prior Publication Data
US 2025/0089987 A1 Mar. 20, 2025

(30) Foreign Application Priority Data
Aug. 1, 2022 (WO) .................. PCT/JP2022/029427

(51) Int. Cl.
*A61B 1/00* (2006.01)
*A61B 1/04* (2006.01)
(Continued)

(52) U.S. Cl.
CPC .. *A61B 1/000096* (2022.02); *A61B 1/000094* (2022.02); *A61B 1/0005* (2013.01);
(Continued)

(58) Field of Classification Search
CPC ........... G06T 17/00; G06T 2207/10068; G06T 2207/20081; G06T 2207/30032;
(Continued)

(56) References Cited

U.S. PATENT DOCUMENTS 6,252,599 B1 6/2001 Natsuko et al.
2004/0249274 A1 12/2004 Yaroslavsky et al.
(Continued)

FOREIGN PATENT DOCUMENTS

WO 2017/203814 A1 11/2017
WO 2019/220848 A1 11/2019
(Continued)

OTHER PUBLICATIONS

International Search Report for PCT Application No. PCT/JP2023/028003, mailed on Oct. 17, 2023.
(Continued)

*Primary Examiner* — Ming Wu
(74) *Attorney, Agent, or Firm* — Sughrue Mion, PLLC

(57) ABSTRACT

In the endoscopic examination support apparatus, three three-dimensional model generation means generates a three-dimensional model of a luminal organ in which an endoscope camera is placed, based on endoscopic images acquired by imaging an interior of the luminal organ with the endoscope camera. The unobserved area detection means detects an area estimated not to be observed by the endoscope camera, as an unobserved area, based on the three-dimensional model. The display image generation means generates a display image including information indicating an observation achievement degree for each of a plurality of sites of the luminal organ, based on the detection result of the unobserved area. The endoscopic examination support apparatus may be used to support user's decision making.

10 Claims, 8 Drawing Sheets

(51) Int. Cl.
*A61B 90/00* (2016.01)
*G06T 7/00* (2017.01)
*G06T 7/70* (2017.01)
*G06T 17/00* (2006.01)

(52) U.S. Cl.
CPC ............... *G06T 7/0012* (2013.01); *G06T 7/70* (2017.01); *G06T 17/00* (2013.01); *A61B 1/04* (2013.01); *A61B 2090/367* (2016.02); *G06T 2207/10068* (2013.01); *G06T 2207/20081* (2013.01); *G06T 2207/30032* (2013.01); *G06T 2207/30096* (2013.01); *G06T 2207/30168* (2013.01); *G06T 2210/41* (2013.01)

(58) Field of Classification Search
CPC . G06T 2207/30096; G06T 2207/30168; G06T 2210/41; G06T 7/0012; G06T 7/70
See application file for complete search history.

(56) References Cited

U.S. PATENT DOCUMENTS

| | | | | |
|---|---|---|---|---|
| 2005/0283065 | A1* | 12/2005 | Babayoff | ............... H04N 13/15 600/407 |
| 2013/0070986 | A1 | 3/2013 | Peleg et al. | |
| 2015/0009214 | A1* | 1/2015 | Lee | ............... G06T 17/10 345/420 |
| 2017/0046845 | A1* | 2/2017 | Boyle | ............... G06T 7/521 |
| 2019/0043215 | A1 | 2/2019 | Ito et al. | |
| 2019/0188906 | A1* | 6/2019 | Krishna | ............... G06T 7/579 |
| 2021/0042925 | A1 | 2/2021 | Usuda | |
| 2021/0321872 | A1 | 10/2021 | Saphier et al. | |
| 2022/0409030 | A1 | 12/2022 | Hane | |
| 2022/0414880 | A1 | 12/2022 | Inoue et al. | |
| 2023/0194850 | A1 | 6/2023 | Shino et al. | |
| 2023/0277036 | A1 | 9/2023 | Yumbe et al. | |

FOREIGN PATENT DOCUMENTS

| | | |
|---|---|---|
| WO | 2021/171464 A1 | 9/2021 |
| WO | 2021/176664 A1 | 9/2021 |
| WO | 2021/234907 A1 | 11/2021 |
| WO | 2022/107492 A1 | 5/2022 |

OTHER PUBLICATIONS

US Office Communication for U.S. Appl. No. 18/398,509, mailed on Oct. 22, 2025.

* cited by examiner

ENDOSCOPIC EXAMINATION SUPPORT APPARATUS, ENDOSCOPIC EXAMINATION SUPPORT METHOD, AND RECORDING MEDIUM

This application is a National Stage Entry of PCT/JP2023/028003 filed on Jul. 31, 2023, which claims priority from Japanese Patent Application PCT/JP2022/029427 filed on Aug. 1, 2022, the contents of all of which are incorporated herein by reference, in their entirety.

TECHNICAL FIELD

The present disclosure relates to techniques available in presenting information to support an endoscopic examination.

BACKGROUND ART

Conventionally, there are known techniques for presenting information to support an endoscopic examination.

Specifically, for example, Patent Document 1 discloses a viewpoint in which, based on an image obtained by imaging an interior of a large intestine, information indicating a portion which can be analyzed and a portion which cannot be analyzed in the large intestine are displayed in a condition associated with a structure of the large intestine.

PRECEDING TECHNICAL REFERENCES

Patent Document

Patent Document 1: International Publication WO2021/171464

SUMMARY

Problem to be Solved

However, Patent Document 1 does not disclose a specific method for presenting information enabling to confirm the observation state of a plurality of sites of the large intestine after the endoscopic examination is completed.

Therefore, according to the technique disclosed in Patent Document 1, for example, when it is necessary to perform the work for specifying a part in the large intestine to which the observation is made, after the endoscopic examination is completed, there is a possibility that an excessive burden is imposed on an operator who creates a report relating to the endoscopic examination.

It is an object of the present disclosure to provide an endoscopic examination support apparatus capable of reducing a burden imposed on an operator who creates a report relating to an endoscopic examination.

Means for Solving the Problem

According to an aspect of the present disclosure, there is provided an endoscopic examination support apparatus comprising:
   a three-dimensional model generation means configured to generate a three-dimensional model of a luminal organ in which an endoscope camera is placed, based on endoscopic images acquired by imaging an interior of the luminal organ with the endoscope camera;
   an unobserved area detection means configured to detect an area estimated not to be observed by the endoscope camera, as an unobserved area, based on the three-dimensional model; and
   a display image generation means configured to generate a display image including information indicating an observation achievement degree for each of a plurality of sites of the luminal organ, based on the detection result of the unobserved area.

According to another aspect of the present disclosure, there is provided an endoscopic examination support method comprising:
   generating a three-dimensional model of a luminal organ in which an endoscope camera is placed, based on endoscopic images acquired by imaging an interior of the luminal organ with the endoscope camera;
   detecting an area estimated not to be observed by the endoscope camera, as an unobserved area, based on the three-dimensional model; and
   generating a display image including information indicating an observation achievement degree for each of a plurality of sites of the luminal organ, based on the detection result of the unobserved area.

According to still another aspect of the present disclosure, there is provided a recording medium recording a program, the program causing a computer to execute:
   generating a three-dimensional model of a luminal organ in which an endoscope camera is placed, based on endoscopic images obtained by imaging an interior of the luminal organ with the endoscope camera;
   detecting an area estimated not to be observed by the endoscope camera, as an unobserved area, based on the three-dimensional model; and
   generating a display image including information indicating an observation achievement degree for each of a plurality of sites of the luminal organ, based on the detection result of the unobserved area.

Effect

According to the present disclosure, it is possible to reduce the burden imposed on an operator who creates a report relating to an endoscopic examination.

EXAMPLE EMBODIMENTS

Preferred example embodiments of the present invention will be described with reference to the accompanying drawings.

First Example Embodiment

[System Configuration]

Figure 1:
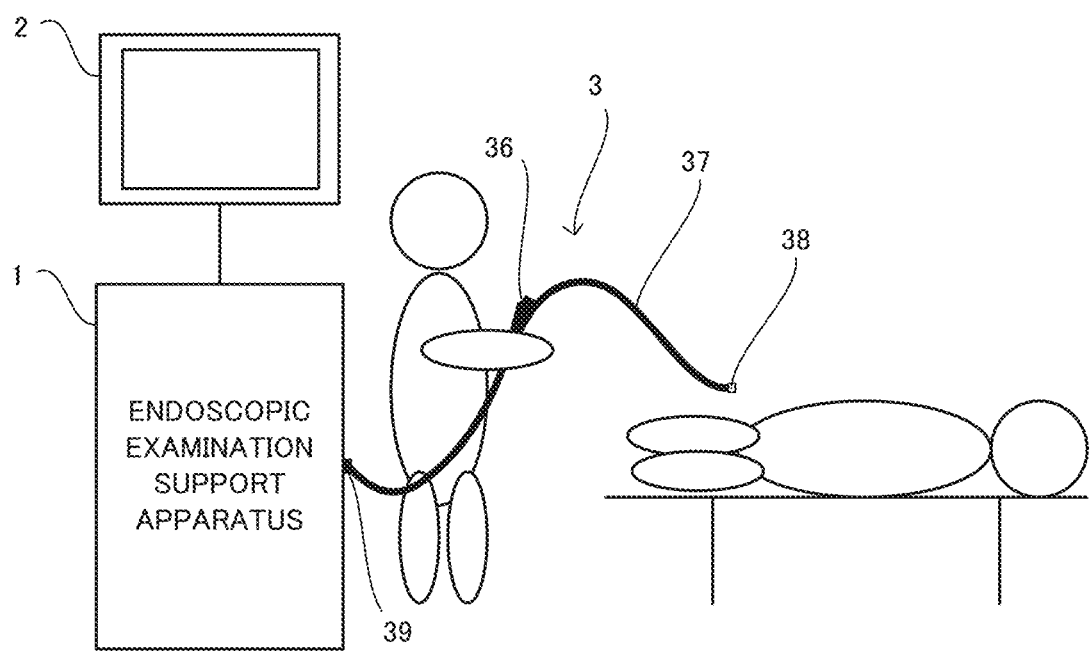
FIG. 1 is a diagram showing a schematic configuration of an endoscopic examination system according to a first example embodiment.

FIG. 1 is a diagram showing a schematic configuration of an endoscopic examination system according to a first example embodiment. The endoscopic examination system 100 includes an endoscopic examination support apparatus 1, a display device 2, and an endoscope 3 connected to the endoscopic examination support apparatus 1, as shown in FIG. 1.

The endoscopic examination support apparatus 1 acquires a video including time-series images obtained by imaging a subject (hereinafter, also referred to as "endoscopic video Ic") from the endoscope 3 during the endoscopic examination, and displays a display image for confirmation by an operator such as a doctor performing the endoscopic examination on the display device 2. Specifically, the endoscopic examination support apparatus 1 acquires a video of the interior of the large intestine obtained during the endoscopic examination from the endoscope 3 as an endoscopic video Ic. The endoscopic examination support apparatus 1 estimates the distance (hereinafter, also referred to as "depth") between the surface of the large intestine, which is a luminal organ, and the endoscope camera provided at the tip portion 38 of the endoscope 3, and the relative posture change of the endoscope camera, based on the images (hereinafter, also referred to as "endoscopic images") extracted from the endoscopic video Ic. Then, the endoscopic examination support apparatus 1 generates a three-dimensional model according to the structure of the large intestine by performing three-dimensional restoration based on the depth and the relative posture change of the endoscope camera. Also, the endoscopic examination support apparatus 1 detects, based on the endoscopic images, a observation difficult area which is an area estimated to be difficult to observe in the endoscopic examination. Also, the endoscopic examination support apparatus 1 detects a lesion candidate area, which is an area estimated as a lesion candidate, based on the endoscopic images. Also, the endoscopic examination support apparatus 1 detects a missing area which is missing in the three-dimensional model because the three-dimensional restoration is not performed or insufficient. Also, the endoscopic examination support apparatus 1 detects at least one of the observation difficult area and the missing area in the three-dimensional model as the unobserved area. Also, the endoscopic examination support apparatus 1 acquires, based on the endoscopic image, subject information indicating which part of a plurality of parts of the large intestine the subject captured by the endoscope camera in the large intestine corresponds to. In addition, the endoscopic examination support apparatus 1 performs mapping processing of associating the unobserved part in the current endoscopic examination of the large intestine with a three-dimensional model (hereinafter, also referred to as a "large intestine model") of the entire large intestine created in advance based on the structure of the a general large intestine (the intestine) on the basis of the detection result of the unobserved area and the subject information or the like. Further, the endoscopic examination support apparatus 1 generates a display image including an outline of the examination result in the endoscopic examination by using the large intestine model on which the above-described mapping processing has been performed, and outputs the generated display image to the display device 2.

Incidentally, the observation difficult area may include, for example, an area that is difficult to visually recognize due to insufficient brightness, an area that is difficult to visually recognize due to the level of blurring, and an area where the state of the mucosal surface cannot be visually recognize due to the presence of the residue. The missing area may include, for example, an area hidden by a shield in the large intestine such as folds, and an area where imaging by the endoscope camera is not performed continuously for a predetermined time or more. The predetermined time described above may be set to 1 second, for example. Further, the plurality of parts of the large intestine described-above may include, for example, a rectum, a sigmoid colon, a descending colon, a transverse colon, an ascending colon, and a cecum.

According to this example embodiment, the processing of detecting the observation difficult area may not be performed. In such a case, it is sufficient that the missing area in the three-dimensional model is detected as the unobserved area.

The display device 2 includes, for example, a liquid crystal monitor or the like. Further, the display device 2 displays the display image or the like outputted from the endoscopic examination support apparatus 1.

The endoscope 3 mainly includes an operation unit 36 for an operator to input instructions such as air supply, water supply, angle adjustment, and image-capturing, a shaft 37 having flexibility and inserted into an organ of a subject to be examined, a tip portion 38 with a built-in endoscope camera such as an ultra-compact imaging element, and a connection unit 39 for connection with the endoscopic examination support apparatus 1.

[Hardware Configuration]

Figure 2:
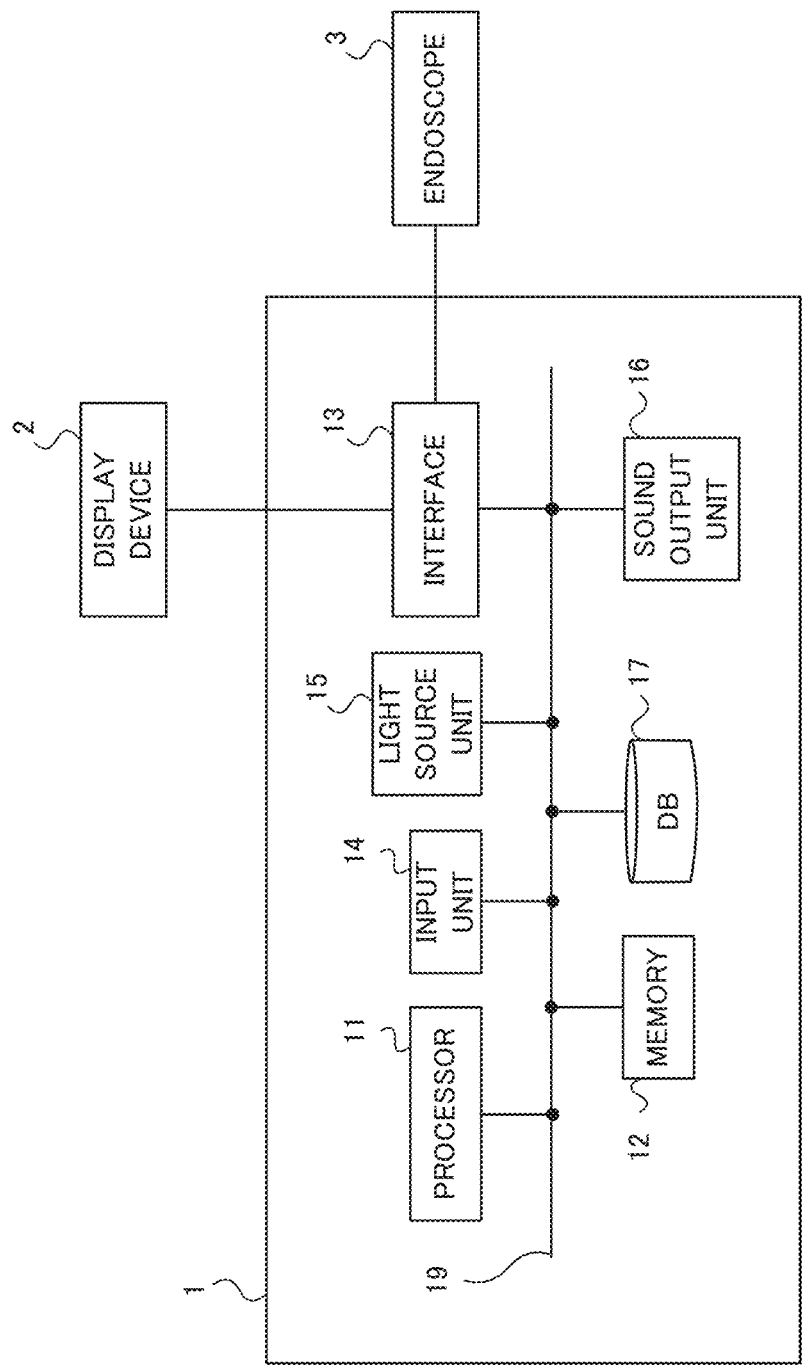
FIG. 2 is a block diagram showing a hardware configuration of an endoscopic examination support apparatus according to the first example embodiment.

FIG. 2 is a block diagram illustrating a hardware configuration of an endoscopic examination support apparatus according to the first example embodiment. The endoscopic examination support apparatus 1 mainly includes a processor 11, a memory 12, an interface 13, an input unit 14, a light source unit 15, a sound output unit 16, and a database (hereinafter, referred to as "DB") 17. Each of these elements is connected via a data bus 19.

The processor 11 executes predetermined processing by executing a program stored in the memory 12. The processor 11 is a processor such as a CPU (Central Processing Unit), a GPU (Graphics Processing Unit), and a TPU (Tensor Processing Unit). The processor 11 may be configured by multiple processors. The processor 11 is an example of a computer. The processor 11 also performs processing related to the generation of a display image including an outline of the examination result of the endoscopic examination, based on the endoscopic images included in the endoscopic video Ic.

The memory 12 may include various volatile memories used as working memories, such as RAM (Random Access Memory) and ROM (Read Only Memory), and non-volatile memories for storing information needed for processing by the endoscopic examination support apparatus 1. Incidentally, the memory 12 may include an external storage device such as a hard disk connected to or incorporated in the endoscopic examination support apparatus 1, and may include a storage medium such as a removable flash memory or a disk medium. In the memory 12, a program for the endoscopic examination support apparatus 1 to execute each process in the present example embodiment is stored.

The memory 12 also temporarily stores a series of endoscopic videos Ic captured by the endoscope 3 during the endoscopic examination, based on the control of the processor 11.

The interface 13 performs an interface operation between the endoscopic examination support apparatus 1 and an external device. For example, the interface 13 supplies a display image generated by the processor 11 to the display device 2. The interface 13 also supplies the illumination light generated by the light source unit 15 to the endoscope 3. The interface 13 also provides an electrical signal indicating the endoscopic video Ic supplied from the endoscope 3 to the processor 11. The interface 13 also provides the endoscopic images extracted from the endoscopic video Ic to the processor 11. The interface 13 may be a communication interface such as a network adapter for wired or wireless communication with an external device, or may be a hardware interface compliant with a USB (Universal Serial Bus), a SATA (Serial AT Attachment), etc.

The input unit 14 generates an input signal based on the operation by the operator. The input unit 14 is, for example, a button, a touch panel, a remote controller, a voice input device, or the like. The light source unit 15 generates light to be supplied to the tip portion 38 of the endoscope 3. The light source unit 15 may also incorporate a pump or the like for delivering water or air to the endoscope 3. The sound output unit 16 outputs the sound based on the control of the processor 11.

The DB 17 stores the endoscopic videos acquired by the past endoscopic examination of the subject. The DB 17 may include an external storage device such as a hard disk connected to or incorporated in the endoscopic examination support apparatus 1, and may include a storage medium such as a removable flash memory. Instead of providing the DB 17 in the endoscopic examination system 100, the DB 17 may be provided in an external server or the like to acquire relevant information from the server through communication.

Incidentally, the endoscopic examination support apparatus 1 may be provided with a sensor capable of measuring the rotation and translation of the endoscope camera, such as a magnetic sensor.

[Functional Configuration]

Figure 3:
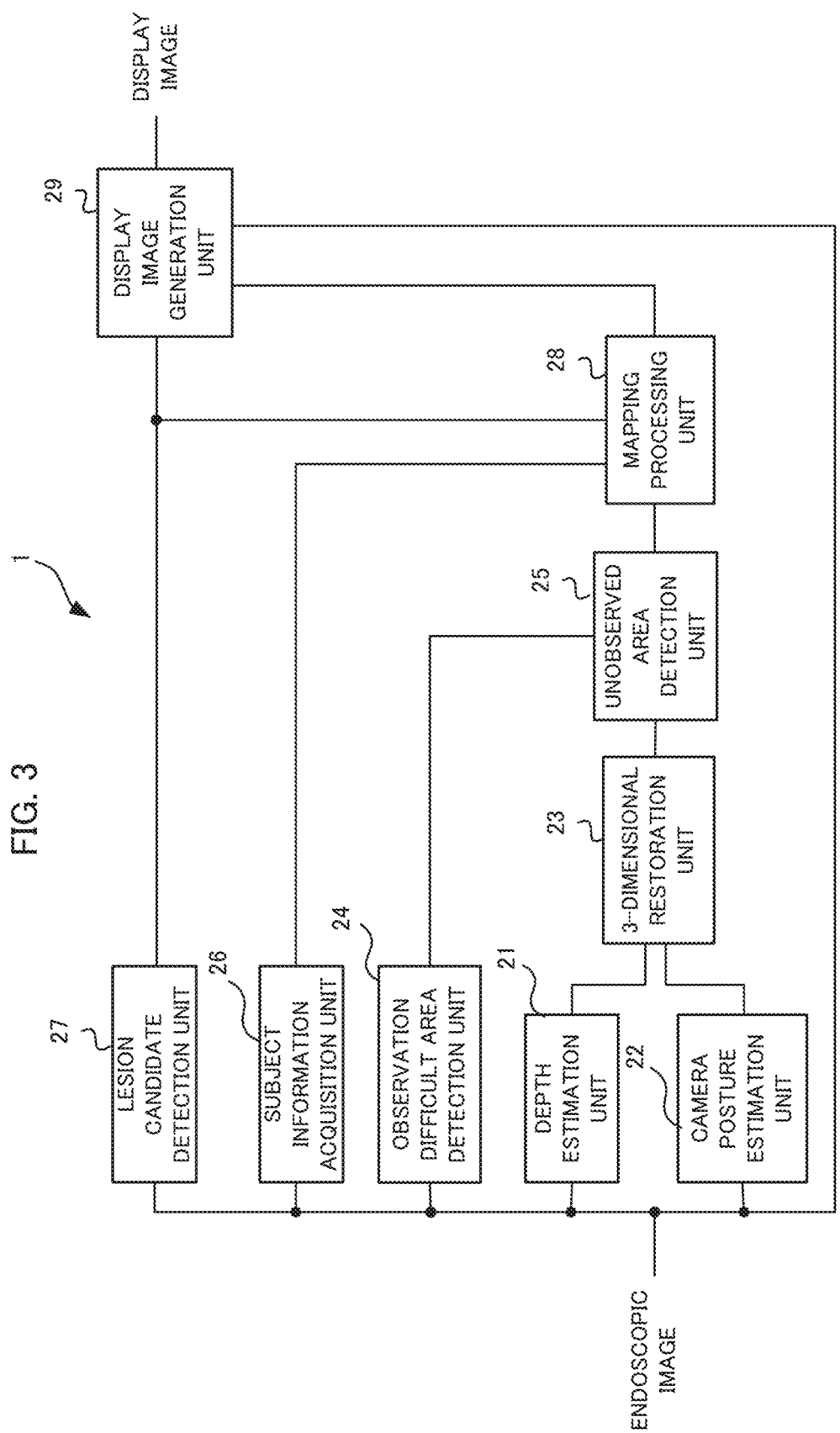
FIG. 3 is a block diagram showing a functional configuration of the endoscopic examination support apparatus according to the first example embodiment.

FIG. 3 is a block diagram illustrating a functional configuration of the endoscopic examination support apparatus according to the first example embodiment. The endoscopic examination support apparatus 1 functionally includes a depth estimation unit 21, a camera posture estimation unit 22, a three-dimensional restoration unit 23, an observation difficult area detection unit 24, an unobserved area detection unit 25, a subject information acquisition unit 26, a lesion candidate detection unit 27, a mapping processing unit 28, and a display image generation unit 29.

The depth estimation unit 21 performs processing for estimating the depth from the endoscopic images using a learned image recognition model or the like. That is, the depth estimation unit 21 has a function as a distance estimation means and estimates the distance between the surface of the luminal organ and the endoscope camera placed in the luminal organ, based on the endoscopic images obtained by imaging the interior of the luminal organ by the endoscope camera. The depth estimation unit 21 outputs the depth estimated by the above-described processing to the three-dimensional restoration unit 23.

The camera posture estimation unit 22 uses two endoscopic images successive in time to perform processing for estimating the rotation and translation of the endoscope camera from the imaging point of the first endoscopic image to the imaging point of the second endoscopic image (i.e., the relative posture change of the endoscope camera, hereinafter simply referred to as "camera posture change"). The camera posture estimation unit 22 performs processing for estimating the camera posture change using a learned image recognition model, for example. That is, the camera posture estimation unit 22 has a function as the posture change estimation means and estimates the relative posture change of the endoscope camera based on the endoscopic images obtained by imaging the interior of the luminal organ by the endoscope camera. The camera posture estimation unit 22 outputs the camera posture change estimated by the above-described processing to the three-dimensional restoration unit 23. The camera posture estimation unit 22 may estimate the camera posture change by using the measurement data acquired from the magnetic sensor or the like.

Here, the image recognition models used in the depth estimation unit 21 and the camera posture estimation unit 22 are machine learning models that are learned, in advance, to estimate the depth and the camera posture change from the endoscopic images. Hereafter, these models are also referred to as "the depth estimation model" and "the camera posture estimation model". The depth estimation model and the camera posture estimation model can be generated by so-called supervised learning.

For the learning of the depth estimation model, for example, teacher data in which the depth is given to an endoscopic image as a correct answer label is used. The endoscopic images and depths used for the learning are collected, in advance, from the endoscope camera and the ToF (Time of Flight) sensor installed in the endoscope. That is, a pair of an RGB image obtained by the endoscope camera and a depth obtained by the ToF sensor is created as teaching data, and learning is performed using the created teaching data.

In addition, for the learning of the camera posture estimation model, for example, teacher data in which the posture change of the endoscope camera is given to the endoscopic images as a correct answer label is used. In this case, the posture change of the endoscope camera can be obtained by using a sensor capable of detecting the rotation and translation, such as a magnetic sensor. That is, a pair of RGB images obtained by the endoscope camera and a posture change of the endoscope camera obtained by the sensor is created as teaching data, and learning is performed using the teaching data.

The teacher data used to learn the depth estimation model and the camera posture estimation model may be created from a simulation video of the endoscope using CG (computer graphics). By doing this, a large amount of teacher data can be created at high speed. The machine learning device uses the teacher data to learn the relationship of the endoscopic images to the depth and the camera posture change, thereby generating the depth estimation model and the camera posture estimation model.

The depth estimation model and the camera posture estimation model may be generated by self-supervised learning. For example, in self-supervised learning, motion parallax is utilized to create teacher data. Specifically, in self-supervised learning, a pair of images of an endoscopic image $I_t$ and an endoscopic image $I_j$, a Depth CNN (Convolutional Neural Network) for estimating a depth from the endoscopic image $I_i$ and a Pose CNN for estimating a relative posture from the endoscopic image $I_i$ and the endoscopic image $I_j$ are prepared. Then, the endoscopic image $I_j$ is reconstructed from the endoscopic image $I_i$ based on the depth estimated by the Depth CNN and the relative posture estimated by the Pose CNN (this is called "the endoscopic image $I_{i \rightarrow j}$"). Then, learning of the model is performed using the difference between the reconstructed endoscopic image $I_{i \rightarrow j}$ and the actual endoscopic image $I_j$ as a loss.

The three-dimensional restoration unit 23 generates a three-dimensional model according to the structure of the large intestine at the time of the endoscopic examination by performing a three-dimensional restoration process on the basis of the depth obtained from the depth estimation unit 21 and the relative posture change of the endoscope camera obtained from the camera posture estimation unit 22. The three-dimensional restoration unit 23 outputs the three-dimensional model, the relative posture change of the endoscope camera, and the position of the endoscope camera to the unobserved area detection unit 25.

That is, the three-dimensional model generation means of the present example embodiment includes the depth estimation unit 21, the camera posture estimation unit 22, and the three-dimensional restoration unit 23.

The observation difficult area detection unit 24 detects the area corresponding to at least one of the areas in the endoscopic image where the brightness is equal to or higher than a predetermined value, where the blur level is equal to or larger than a predetermined value, and where the residue is present, as the observation difficult area, for example. That is, the observation difficult area detection unit 24 detects, based on the endoscopic images, the area in the luminal organ where the observation by the endoscope camera is estimated to be difficult, as the observation difficult area. Then, the observation difficult area detection unit 24 outputs the detection result of the observation difficult area to the unobserved area detection unit 25. The observation difficult area detection unit 24 may associate information indicating factors of estimating that the observation by the endoscope camera is difficult, such as insufficient brightness, occurrence of strong blurring, and the presence of residue, with the detection result of the observation difficult area. In other words, information indicating observation difficult factors may be associated with the detection result of the observation difficult area.

The unobserved area detection unit 25 detects the area that is missing in the three-dimensional model as the missing area on the basis of the relative posture change of the endoscope camera, the position of the endoscope camera, and the three-dimensional model. Specifically, for example, the unobserved area detection unit 25 detects the area in the three-dimensional model corresponding to at least one of the area that is hidden by a shield such as folds and the area where imaging by the endoscope camera has not been performed continuously for a predetermined time or more, as the missing area. Also, for example, the unobserved area detection unit 25 detects the area in the three-dimensional model acquired from the three-dimensional restoration unit 23 during the last 5 seconds where the three-dimensional restoration has not been performed continuously for one second or more, as the missing area. Also, the unobserved area detection unit 25 performs processing for specifying an area corresponding to the detection result of the observation difficult area obtained from the observation difficult area detection unit 24 in the three-dimensional model generated by the three-dimensional restoration unit 23. Also, the unobserved area detection unit 25 detects the observation difficult area and the missing area in the three-dimensional model as the unobserved area. That is, the unobserved area detection unit 25 detects an area that is estimated not to be observed by the endoscope camera as the unobserved area on the basis of the three-dimensional model of the luminal organ in which the endoscope camera is present. Further, the unobserved area detection unit 25 can obtain the latest detection result in accordance with the observation history of the large intestine (intestinal tract) by the endoscope camera, as the detection result of the unobserved area in the three-dimensional model. Then, the unobserved area detection unit 25 outputs the relative posture change of the endoscope camera, the position of the endoscope camera, the three-dimensional model, and the detection result of the unobserved area to the mapping processing unit 28. The unobserved area detection unit 25 may associate information indicating factors of estimating that the observation by the endoscope camera is not performed, such as the presence of a shielding object, the absence of imaging, insufficient brightness, the occurrence of strong blurring, and the presence of a residue, with the detection result of the unobserved area. In other words, information indicating factors of non-observation may be associated with the detection result of the unobserved area.

Based on the endoscopic image, the subject information acquisition unit 26 acquires the subject information indicating which part of a plurality of parts of the large intestine the subject imaged by the endoscope camera corresponds to. In addition, the subject information acquisition unit 26 acquires the subject information by processing using, for example, an image recognition model that is learned to output information relating to a site in the large intestine in response to the input of an endoscopic image obtained by imaging the large intestine. Then, the subject information acquisition unit 26 outputs the subject information to the mapping processing unit 28.

The lesion candidate detection unit 27 detects a lesion candidate area that is an area estimated as a lesion candidate in the endoscopic image using a learned image recognition model or the like. Specifically, the lesion candidate detection unit 27 detects, for example, an area including a polyp as the lesion candidate area. That is, the lesion candidate detection unit 27 detects the lesion candidates area, which is estimated as the area of the lesion candidate, based on the endoscopic image obtained by imaging the interior of the luminal organ by the endoscope camera. Then, the lesion candidate detection unit 27 outputs the detection result of the lesion candidate area to the mapping processing unit 28 and the display image generation unit 29.

The mapping processing unit 28 performs mapping processing of associating the unobserved area and the subject candidate area in the current endoscopic examination with the large intestine model on the basis of the relative posture change of the endoscope camera, the position of the endoscope camera, the three-dimensional model obtained from the three-dimensional restoration unit 23, the detection result of the unobserved area, the subject information, and the detection result of the lesion candidate area. According to such mapping processing, the position in the large intestine specified based on the relative posture change of the endoscope camera, the position of the endoscope camera, and the subject information can be excluded from the unobserved area. In the following description, an area that does not correspond to the unobserved area in the plurality of sites of the large intestine, such as the area excluded from the unobserved area by the mapping processing described above, is referred to as the observed area. The mapping processing unit 28 outputs the large intestine model subjected to the above-described mapping processing to the display image generation unit 29.

The display image generation unit 29 generates a display image based on, for example, the endoscopic image and the detection result of the lesion candidate area during the endoscopic examination, and outputs the generated display image to the display device 2. Also, during the endoscopic examination, the display image generation unit 29 acquires the large intestine model from the mapping processing unit 28 and updates the acquired large intestine model to the latest state. Further, during the endoscopic examination, the display image generation unit 29 acquires the detection result of the lesion candidate area from the lesion candidate detection unit 27 and accumulates the detection results of the acquired lesion candidate area. Further, when it is detected that a predetermined instruction is made after the completion of the endoscopic examination, the display image generation unit 29 generates the display image including the outline of the examination result in the endoscopic examination based on the detection results of the lesion candidate area accumulated during the endoscopic examination and the latest large intestine model acquired during the endoscopic examination, and outputs the generated display image to the display device 2.

In the following description, the display image generated during the period in which the endoscopic examination is performed is also referred to as "observation image". In the following description, the display image generated after the end of the endoscopic examination and including the outline of the examination result of the endoscopic examination is also referred to as "examination result image".

The observation image may include an endoscopic image. In addition, the observation image may include information indicating the latest detection result of the lesion candidate area.

The examination result image may include information that indicates the observation achievement degree at multiple sites in the large intestine. Incidentally, the observation achievement degree at a single site in the large intestine can be calculated as, for example, a value obtained by subtracting the observation non-achievement degree from "1." The observation non-achievement degree can be calculated as a division value obtained by dividing the area of the unobserved area mapped to the one part in the large intestine model by the predetermined surface area calculated based on the standard surface area of that one part. In addition, the observation achievement degree at a single site in the large intestine may be obtained as a value belonging to the range from 0 to 1, or may be obtained as a value belonging to the range from 0% to 100%. That is, the display image generation unit 29 generates a display image including information indicating the observation achievement degree for each of multiple sites of the luminal organ on the basis of the detection result of the unobserved area associated with the large intestine model.

In addition, the examination result image may include information indicating the position of the unobserved area at the multiple sites of the large intestine.

The examination result image may include information capable of identifying non-observation factors associated with the detection result of the unobserved area. Specifically, in the examination result image, for example, the first non-observation factor associated with the detection result of the first unobserved area may be represented by a first color, and the second non-observation factor associated with the detection result of the second unobserved area may be represented by a second color.

Further, the examination result image may include at least one of information indicating the total number of the lesion candidate areas detected based on the endoscopic images, information indicating the positions of the lesion candidate areas based on the endoscopic images, and information indicating the states of the lesion candidate areas detected based on the endoscopic images.

In addition, the examination result image may include the large intestine model, or may include a large intestine image that is an image created in advance based on the general structure of a large intestine. In the following, unless otherwise mentioned, the image viewing the cross section of the entire area of the large intestine cut along the vertical direction of the human body so as to be seen from the front direction of the human body shall be referred to as a large intestine image.

According to the present example embodiment, information for identifying the unobserved area and the observed area may be added to the large intestine model or the large intestine image included in the examination result image. That is, the display image generation unit 29 generates a display image including information capable of identifying the unobserved area and the observed area.

Further, according to the present example embodiment, for example, when one unobserved area in the large intestine model or the large intestine image included in the examination result image is designated, the image of the observed area in the vicinity of the designated one unobserved area may be reproduced.

Further, according to the present example embodiment, for example, information capable of identifying the unobserved area existing in the ventral side (the inner wall of the ventral side of the large intestine) and the unobserved area existing in the back side (the inner wall of the back side of the large intestine) may be added to the large intestine model or the large intestine image included in the examination result image. In addition, in such a case, for example, the unobserved area on the ventral side and the unobserved area on the back side may be represented by different colors.

[Display Example]

Figure 4:
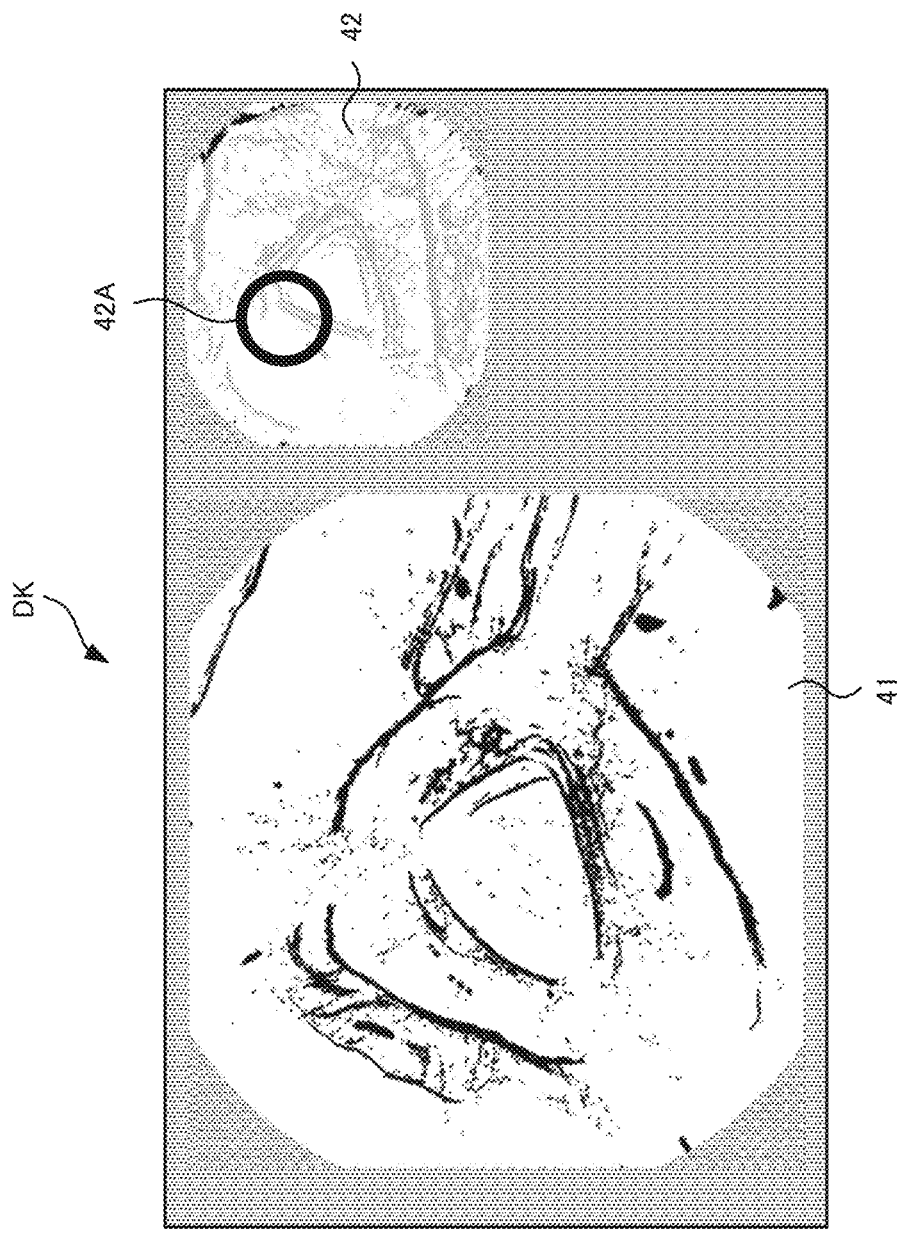
FIG. 4 is a diagram for explaining a specific example of an observation image.
Figure 5:
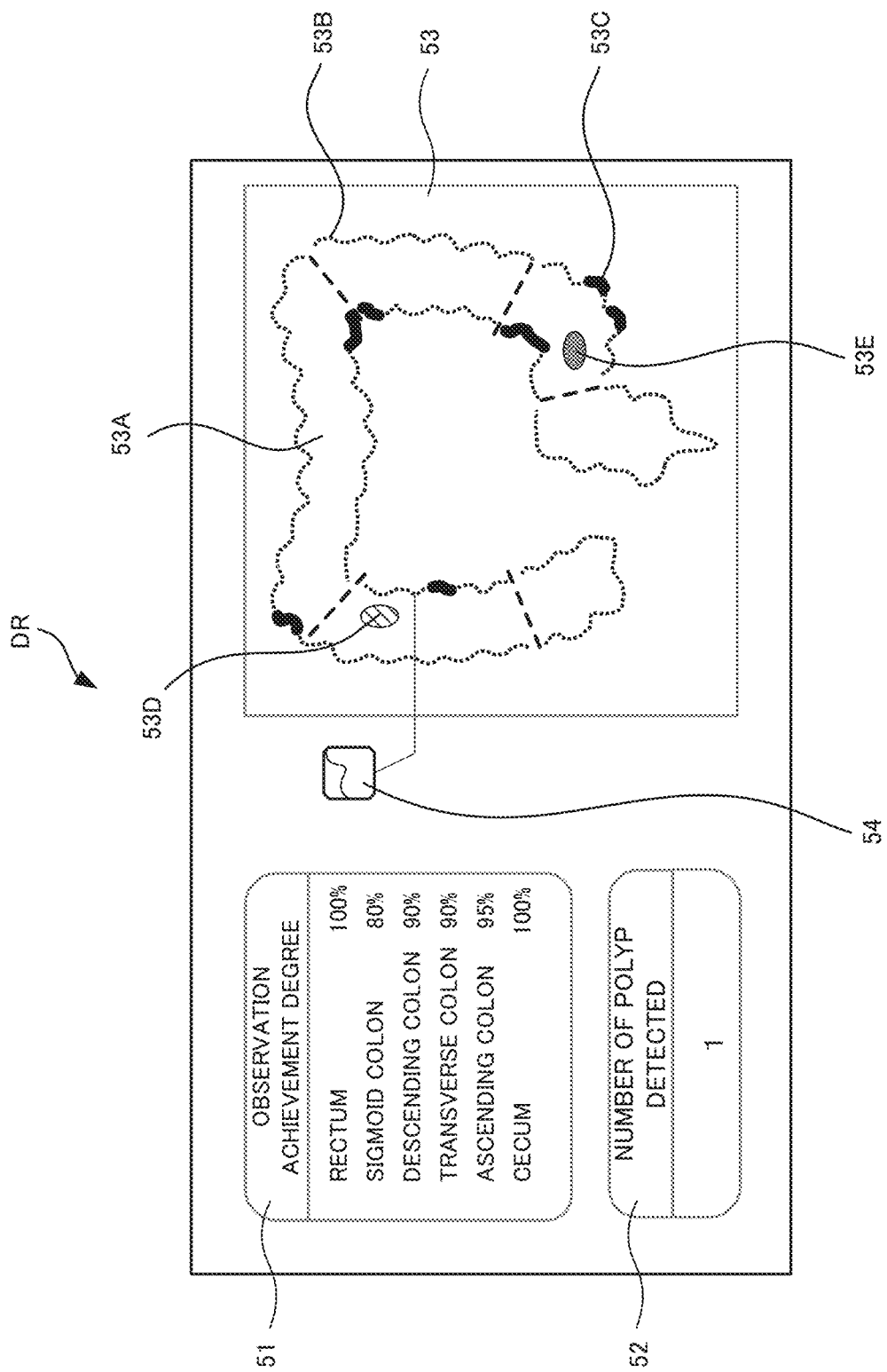
FIG. 5 is a diagram for explaining a specific example of an examination result image.

Subsequently, a specific example of the observation image and the examination result image displayed on the display device 2 will be described. FIG. 4 is a diagram for explaining a specific example of the observation image. FIG. 5 is a diagram for explaining a specific example of the examination result image.

The observation image DK of FIG. 4 is an image to be displayed on the display device 2 during the endoscopic examination. The observation image DK includes an endoscopic image 41 and a lesion candidate image 42.

The endoscopic image 41 is an image included in the endoscopic video Ic obtained during the endoscopic examination. The endoscopic image 41 also includes a subject within the field of view at the current position of the endoscope camera and is updated in response to movement of the endoscope camera.

The lesion candidate image 42 has a size smaller than the endoscopic image 41 and is located on the right side of the endoscopic image 41. In addition, the lesion candidate image 42 is an image generated by superimposing the lesion position information 42A on other endoscopic image acquired prior to the timing at which the endoscopic image 41 is acquired.

The lesion position information 42A is displayed as information indicating the latest detection result of the lesion candidate area. Further, according to the display example of FIG. 4, the lesion position information 42A is displayed as a circular marker surrounding the periphery of the lesion candidate area.

The examination result image DR of FIG. 5, is an image to be displayed on the display device 2 when a predetermined instruction such as an instruction to display the examination result is made after the endoscopic examination is completed, for example. The examination result image DR includes an observation achievement degree display area 51, a lesion detection count display area 52, and an observation result information display area 53. In addition, the examination result image DR includes a lesion candidate image 54 corresponding to the information indicating the state of the lesion candidate area detected at the time of the endoscopic examination.

In the observation achievement degree display area 51, a value indicating the observation achievement degree for each of the multiple parts of the large intestine is displayed. According to the display example of the observation achievement degree display area 51 of FIG. 5, it can be confirmed that there is no unobserved area in the rectum and the cecum in which the observation achievement degree is 100%. In addition, according to the display example of the observation achievement degree display area 51 of FIG. 5, it can be confirmed that there is an unobserved area in the sigmoid colon, the descending colon, the transverse colon, and the ascending colon in which the observation achievement degree is less than 100%. Further, according to the display example of the observation achievement degree display area 51 of FIG. 5, it is possible to confirm that the endoscope camera has reached the cecum which is the innermost part of the large intestine in the endoscopic examination.

In the lesion detection count display area 52, information indicating the total number of the lesion candidate areas detected at the time of the endoscopic examination is displayed. According to the display example of the lesion detection count display area 52 of FIG. 5, it is possible to confirm that one area including a polyp corresponding to the lesion candidate area is detected at the time of endoscopic examination.

The observation result information display area 53 displays a large intestine image 53A created as a schematic diagram showing a plurality of sites of the large intestine by dividing the large intestine by broken lines. In addition, the large intestine image 53A includes observed area information 53B that is information indicating the observed areas in the plurality of sites of the large intestine. In addition, the large intestine image 53A includes unobserved area information 53C, 53D and 53E that are information indicating the position of the unobserved area at the plurality of sites of the large intestine.

According to the display example of FIG. 5, the dotted line part in the schematic diagram of the large intestine included in the large intestine image 53A is displayed as the observed area information 53B. Further, according to the display example of FIG. 5, the thick line part in the schematic diagram of the large intestine included in the large intestine image 53A is displayed as the unobserved area information 53C. Therefore, according to the display example of FIG. 5, it is possible to identify the unobserved areas and the observed areas. Further, according to the display example of the observed are information 53B and unobserved area information 53C of FIG. 5, it is possible to confirm the part in the plurality of sites of the large intestine where the unobserved area is present. Incidentally, according to the present example embodiment, in the large intestine image 53A, the observed area information 53B and the unobserved area information 53C may be displayed in a different display mode. Specifically, for example, the observed area information 53B and the unobserved area information 53C may be displayed in different colors in the large intestine image 53A.

The unobserved area information 53D is information indicating the position of the unobserved area on the ventral side in the large intestine. In the large intestine image 53A, the unobserved area information 53D is displayed in a display mode different from the observed area information 53B, the unobserved area information 53C and the unobserved area information 53E. Specifically, the unobserved area information 53D is displayed by the pattern or color different from the observed area information 53B, the unobserved area information 53C and the unobserved area information 53E. According to the display of the unobserved area information 53D of FIG. 5, it can be confirmed that there is an unobserved area in the ventral side of the ascending colon. Incidentally, according to the present example embodiment, the unobserved area information 53D may be displayed by the different pattern or color depending on the non-observation factor (shielded, unimaged, insufficient brightness, occurrence of strong blurring, or presence of a residue).

The unobserved area information 53E is information indicating the position of the unobserved area on the back side in the large intestine. In the large intestine image 53A, the unobserved area information 53E is displayed in a display mode different from the observed area information 53B, the unobserved area information 53C and the unobserved area information 53D. Specifically, the unobserved area information 53E is displayed by the pattern or color different from the observed area information 53B, the unobserved area information 53C and the unobserved area information 53E. According to the display of the unobserved area information 53E of FIG. 5, it can be confirmed that there is an unobserved area in the back side of the sigmoid colon. Incidentally, according to the present example embodiment, the unobserved area information 53E may be displayed by the different pattern or color depending on the non-observation factor (shielded, unimaged, insufficient brightness, occurrence of strong blurring, or presence of a residue).

The lesion candidate image 54 is a thumbnail image of the lesion candidate area detected during the endoscopic examination. Further, the lesion candidate image 54 is displayed so as to be associated with the position where the lesion candidate area is detected in the observed area information 53B. According to the display example of FIG. 5, the lesion candidate image 54 of the same number as the total number (one) of the lesion candidate areas displayed in the lesion detection count display area 52 is displayed. Incidentally, according to the present example embodiment, when the lesion candidate image 54 is clicked, an enlarged image of the lesion candidate area, or an image captured in the periphery of the lesion candidate area may be displayed.

[Processing Flow]

Figure 6:
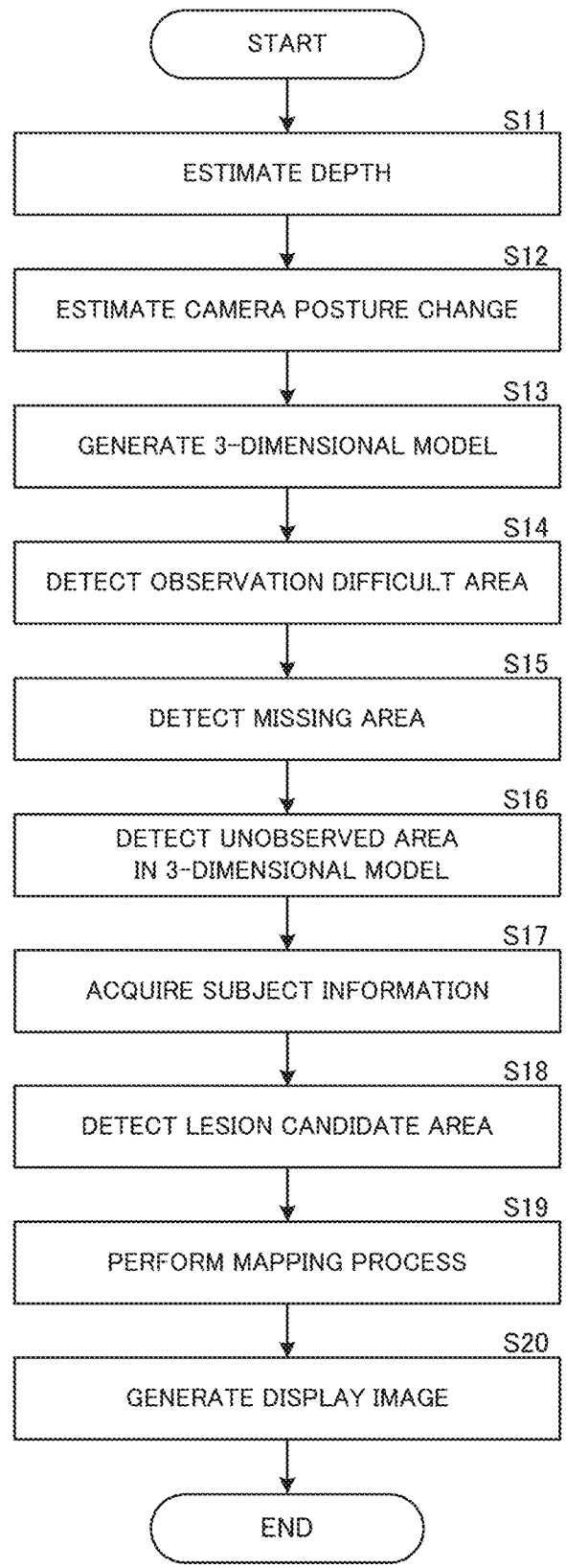
FIG. 6 is a flowchart illustrating an example of processing performed by the endoscopic examination support apparatus according to the first example embodiment.

Subsequently, a flow of processing performed in the endoscopic examination support apparatus according to the first example embodiment will be described. FIG. 6 is a flowchart illustrating an example of processing performed in the endoscopic examination support apparatus according to the first example embodiment.

First, the endoscopic examination support apparatus 1 estimates the depth from the endoscopic images obtained during the endoscopic examination (step S11).

Next, the endoscopic examination support apparatus 1 estimates the camera posture change from two endoscopic images successive in time obtained during the endoscopic examination (step S12).

Subsequently, the endoscopic examination support apparatus 1 generates a three-dimensional model according to the structure of the large intestine at the time of the endoscopic examination by performing a three-dimensional restoration process on the basis of the depth obtained in step S11 and the camera posture change obtained in step S12 (step S13).

Subsequently, the endoscopic examination support apparatus 1 detects the observation difficult area based on the endoscopic images obtained during the endoscopic examination (step S14).

Subsequently, the endoscopic examination support apparatus 1 detects the missing area in the three-dimensional model generated in step S13 (step S15).

Subsequently, the endoscopic examination support apparatus 1 detects the area corresponding to the observation difficult area detected in step S14 and the area corresponding to the missing area detected in step S15 as the unobserved area in the three-dimensional model generated in step S13 (step S16).

Subsequently, the endoscopic examination support apparatus 1 acquires the subject information based on the endoscopic images obtained during the endoscopic examination (step S17).

Subsequently, the endoscopic examination support apparatus 1 detects the lesion candidate area based on the endoscopic images obtained during the endoscopic examination (step S18). In addition, the endoscopic examination support apparatus 1 accumulates the detection results of the lesion candidate areas obtained in step S18 during the endoscopic examination.

Subsequently, the endoscopic examination support apparatus 1 performs mapping processing of associating the unobserved area and the lesion candidate area with the large intestine model on the basis of the detection result of the unobserved area obtained in step S16, the subject information obtained in step S17, and the detection result of the lesion candidate area obtained in step S18 (step S19). In addition, the endoscopic examination support apparatus 1 acquires the latest large intestine model by updating the result of the mapping processing of step S19 during the endoscopic examination.

After the endoscopic examination is completed, the endoscopic examination support apparatus 1 generates the examination result image corresponding to the endoscopic examination on the basis of the detection results of the lesion candidate area accumulated by performing the process of step S18 during the endoscopic examination, and the latest large intestine model acquired by performing the mapping processing of step S19 during the endoscopic examination (step S20). Then, the examination result images generated in step S20 is displayed on the display device 2.

In the present example embodiment, the process of step S12 may be executed prior to step S11, or the process of step S11 may be executed simultaneously with the process of step S12.

As described above, according to the present example embodiment, after the endoscopic examination is completed, it is possible to display an examination result image including information indicating the observation achievement degree for each of a plurality of sites of the large intestine. Therefore, according to this example embodiment, it is possible to reduce the burden imposed on an operator who creates the report for the endoscopic examination. In addition, the endoscopic examination support apparatus can be used to support the user's decision making.

Further, according to the present example embodiment, it is possible to grasp the skill of the operator at the time when the operator performs the endoscopic examination, based on the above-described observation achievement degree. Therefore, according to the present example embodiment, it is possible to contribute to the improvement in the skill of the operator who performs the endoscopic examination of the large intestine.

Second Example Embodiment

Figure 7:
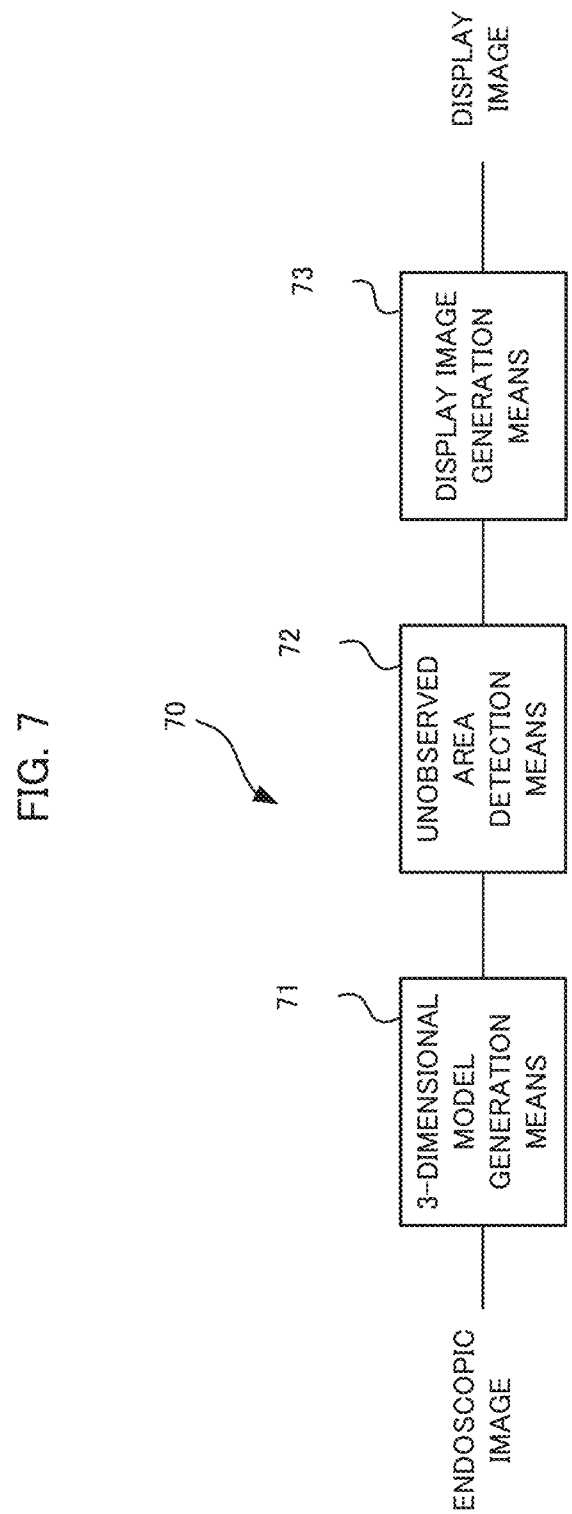
FIG. 7 is a block diagram showing a functional configuration of an endoscopic examination support apparatus according to a second example embodiment.

FIG. 7 is a block diagram illustrating a functional configuration of an endoscopic examination support apparatus according to a second example embodiment.

The endoscopic examination support apparatus 70 according to this example embodiment has the same hardware configuration as the endoscopic examination support apparatus 1. Further, the endoscopic examination support apparatus 70 includes a three-dimensional model generation means 71, an unobserved area detection means 72, and a display image generation means 73.

Figure 8:
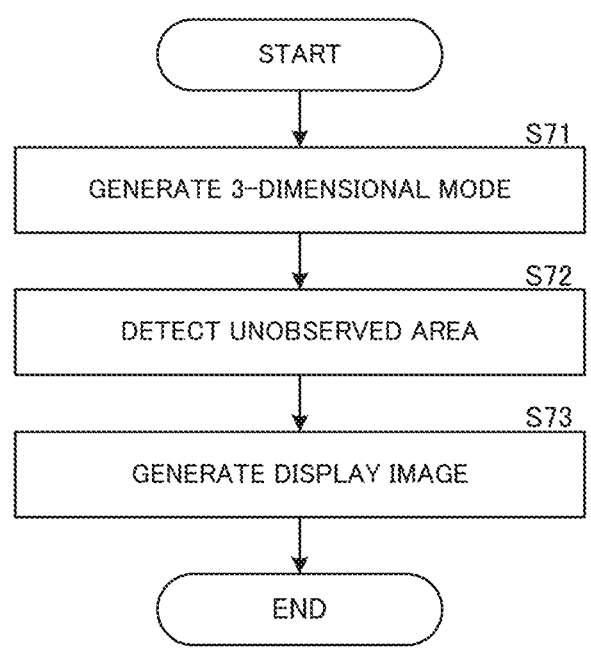
FIG. 8 is a flowchart illustrating an example of processing performed by the endoscopic examination support apparatus according to the second example embodiment.

FIG. 8 is a flowchart illustrating an example of processing performed in the endoscopic examination support apparatus according to the second example embodiment.

The three-dimensional model generation means 71 generates a three-dimensional model of a luminal organ in which an endoscope camera is placed, based on endoscopic images acquired by imaging an interior of the luminal organ with the endoscope camera (step S71).

The unobserved area detection means 72 detects an area estimated not to be observed by the endoscope camera, as an unobserved area, based on the three-dimensional model (step S72).

The display image generation means 73 generates a display image including information indicating an observation achievement degree for each of a plurality of sites of the luminal organ, based on the detection result of the unobserved area (step S73).

According to this example embodiment, it is possible to reduce the burden imposed on an operator who creates the report for the endoscopic examination.

A part or all of the example embodiments described above may also be described as the following supplementary notes, but not limited thereto.

(Supplementary Note 1)

An endoscopic examination support apparatus comprising:

a three-dimensional model generation means configured to generate a three-dimensional model of a luminal organ in which an endoscope camera is placed, based on endoscopic images acquired by imaging an interior of the luminal organ with the endoscope camera;

an unobserved area detection means configured to detect an area estimated not to be observed by the endoscope camera, as an unobserved area, based on the three-dimensional model; and a display image generation means configured to generate a display image including information indicating an observation achievement degree for each of a plurality of sites of the luminal organ, based on the detection result of the unobserved area.

(Supplementary Note 2)

The endoscopic examination support apparatus according to Supplementary note 1, wherein the display image generation means generates the display image including information indicating a position of the unobserved area at each of the plurality of sites.

(Supplementary Note 3)

The endoscopic examination support apparatus according to Supplementary note 1, wherein the display image generation means generates the display image including information for identifying the unobserved area at each of the plurality of sites and an observed area at each of the plurality of sites, the observed area being an area which is not corresponding to the unobserved area.

(Supplementary Note 4)

The endoscopic examination support apparatus according to Supplementary note 1, wherein the display image generation means generates the display image including information for identifying a non-observation factor associated with a detection result of the unobserved area.

(Supplementary Note 5)

The endoscopic examination support apparatus according to Supplementary note 1, further comprising a lesion candidate detection means configured to detect a lesion candidate area, which is an area estimated to be a lesion candidate, by a learned machine learning model based the endoscopic image,
wherein the display image generation means generates the display image including at least one of information indicating a total number of the lesion candidate areas, information indicating a position of the lesion candidate area, and information indicating a state of the lesion candidate area.

(Supplementary Note 6)

The endoscopic examination support apparatus according to Supplementary note 1, wherein the unobserved area detection means detects, as the unobserved area, at least one of an area in the interior of the luminal organ where observation by the endoscope camera is estimated to be difficult, and a missing area in the three-dimensional model.

(Supplementary Note 7)

The endoscopic examination support apparatus according to Supplementary note 6,
wherein the observation difficult area corresponds to at least one of the area in the endoscope image where brightness is less than a predetermined value, where blurred amount is smaller than a predetermined value, and where a residue is present, and
wherein the unobserved area detection means detects an area corresponding to the observation difficult area in the three-dimensional model, as the unobserved area.

(Supplementary Note 8)

The endoscopic examination support apparatus according to Supplementary note 6, wherein the missing area is an area in the three-dimensional model which corresponds to at least one of an area hidden by a shield in the lumen organ and an area in which imaging by the endoscope camera is not performed continuously for a predetermined time or more.

(Supplementary Note 9)

An endoscopic examination support method comprising:
generating a three-dimensional model of a luminal organ in which an endoscope camera is placed, based on endoscopic images acquired by imaging an interior of the luminal organ with the endoscope camera;
detecting an area estimated not to be observed by the endoscope camera, as an unobserved area, based on the three-dimensional model; and
generating a display image including information indicating an observation achievement degree for each of a plurality of sites of the luminal organ, based on the detection result of the unobserved area.

(Supplementary Note 10)

A recording medium recording a program, the program causing a computer to execute:
generating a three-dimensional model of a luminal organ in which an endoscope camera is placed, based on endoscopic images obtained by imaging an interior of the luminal organ with the endoscope camera;
detecting an area estimated not to be observed by the endoscope camera, as an unobserved area, based on the three-dimensional model; and
generating a display image including information indicating an observation achievement degree for each of a plurality of sites of the luminal organ, based on the detection result of the unobserved area.

This application is based upon and claims the benefit of priority from the international application PCT/JP2022/029427 filed Aug. 1, 2022, and its entire disclosure is incorporated herein by reference.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

1 Endoscopic examination support apparatus
2 Display device
3 Endoscope
11 Processor
12 Memory
13 Interface
21 Depth estimation unit
22 Camera posture estimation unit
23 three-dimensional restoration uniting unit
24 Observation difficult area detection unit
25 Unobserved area detection unit
26 Subject information acquisition unit
27 Lesion candidate detection unit
28 Mapping processing unit
29 Display image generation unit
100 Endoscopic examination system

What is claimed is:
1. An endoscopic examination support apparatus comprising:
a memory configured to store instructions; and
a processor configured to execute the instructions to:
generate a three-dimensional model of a luminal organ in which an endoscope camera is placed, based on endoscopic images acquired by imaging an interior of the luminal organ with the endoscope camera;
detect an area estimated not to be observed by the endoscope camera, as an unobserved area, based on the three-dimensional model; and
generate a display image including, as information indicating an observation achievement degree for each of a plurality of sites of the luminal organ, information indicating a position of the detected unobserved area in the plurality of sites, information indicating a position of an observed area which does not corresponds to the unobserved area in the plurality of sites, and information capable of identifying a non-observation factor associated with a detection result of the unobserved area, based on the detection result of the unobserved area.

2. The endoscopic examination support apparatus according to claim 1, wherein the processor generates the display image including information indicating a position of the unobserved area at each of the plurality of sites.

3. The endoscopic examination support apparatus according to claim 1, wherein the processor generates the display image including information for identifying the unobserved area at each of the plurality of sites and an observed area at each of the plurality of sites, the observed area being an area which is not corresponding to the unobserved area.

4. The endoscopic examination support apparatus according to claim 1, wherein the processor generates the display image including information for identifying a non-observation factor associated with a detection result of the unobserved area.

5. The endoscopic examination support apparatus according to claim 1,
wherein the processor is further configured to execute the instructions to detect a lesion candidate area, which is an area estimated to be a lesion candidate, by a learned machine learning model based the endoscopic image,
wherein the processor generates the display image including at least one of information indicating a total number of the lesion candidate areas, information indicating a position of the lesion candidate area, and information indicating a state of the lesion candidate area.

6. The endoscopic examination support apparatus according to claim 1, wherein the processor detects, as the unobserved area, at least one of an area in the interior of the luminal organ where observation by the endoscope camera is estimated to be difficult, and a missing area in the three-dimensional model.

7. The endoscopic examination support apparatus according to claim 6,
wherein the detected observation difficult area corresponds to at least one of the area in the endoscopic image where brightness is less than a predetermined value, where blurred amount is smaller than a predetermined value, and where a residue is present, and
wherein the processor detects an area corresponding to the observation difficult area in the three-dimensional model, as the unobserved area.

8. The endoscopic examination support apparatus according to claim 6, wherein the missing area is an area in the three-dimensional model which corresponds to at least one of an area hidden by a shield in the lumen organ and an area in which imaging by the endoscope camera is not performed continuously for a predetermined time or more.

9. An endoscopic examination support method comprising:
generating a three-dimensional model of a luminal organ in which an endoscope camera is placed, based on endoscopic images acquired by imaging an interior of the luminal organ with the endoscope camera;
detecting an area estimated not to be observed by the endoscope camera, as an unobserved area, based on the three-dimensional model; and
generating a display image-including, as information indicating an observation achievement degree for each of a plurality of sites of the luminal organ, information indicating a position of the detected unobserved area in the plurality of sites, information indicating a position of an observed area which does not corresponds to the unobserved area in the plurality of sites, and information capable of identifying a non-observation factor associated with a detection result of the unobserved area, based on the detection result of the unobserved area.

10. A non-transitory computer-readable recording medium recording a program, the program causing a computer to execute:
generating a three-dimensional model of a luminal organ in which an endoscope camera is placed, based on endoscopic images obtained by imaging an interior of the luminal organ with the endoscope camera;
detecting an area estimated not to be observed by the endoscope camera, as an unobserved area, based on the three-dimensional model; and
generating a display image-including, as information indicating an observation achievement degree for each of a plurality of sites of the luminal organ, information indicating a position of the detected unobserved area in the plurality of sites, information indicating a position of an observed area which does not corresponds to the unobserved area in the plurality of sites, and information capable of identifying a non-observation factor associated with a detection result of the unobserved area, based on the detection result of the unobserved area.

* * * * *